July 23, 1963

J. C. PETREA 3,098,537

LARGE VOLUME WEIGHER

Filed Nov. 13, 1961

INVENTOR.
James C. Petrea
BY
Bacon & Thomas
ATTORNEYS

July 23, 1963

J. C. PETREA 3,098,537

LARGE VOLUME WEIGHER

Filed Nov. 13, 1961

INVENTOR.
James C. Petrea
BY
Bacon & Thomas

ATTORNEYS

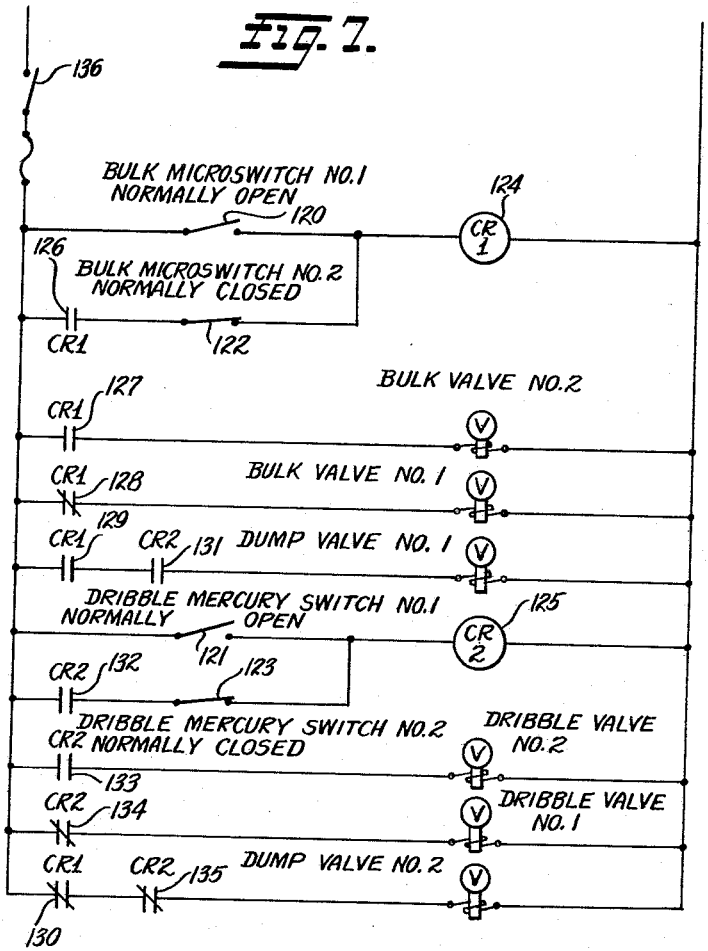

United States Patent Office 3,098,537
Patented July 23, 1963

3,098,537
LARGE VOLUME WEIGHER
James C. Petrea, Durham, N.C., assignor to Sperry Rand Corporation, Wilmington, Del., a corporation of Delaware
Filed Nov. 13, 1961, Ser. No. 151,719
15 Claims. (Cl. 177—98)

This invention relates to weighing apparatus and particularly to apparatus for accurately weighing large volumes of fluent material in a relatively short period of time.

In general and by way of example, the apparatus comprises a pair of adjacent weighing devices each having a material-receiving receptacle. A feed means directs a continuous stream of fluent material toward the apparatus to a point where it engages deflecting means operable to deflect all or part of the stream into one or the other of the receptacles. An intended mode of operation is to have the deflecting means first deflect the entire stream into one receptacle until a predetermined bulk weight is deposited therein. At that time the deflecting means are manipulated to deflect a major portion, or bulk stream, of said stream of material into the other receptacle while continuing to deflect a minor or dribble portion into the first receptacle. This condition is maintained until final weight is achieved in the first receptacle at which time the entire stream is then deflected to the second receptacle. The cycle is then repeated with reference to the second receptacle.

During those intervals of time when the deflecting means is deflecting the entire stream into one receptacle, dumping means are operated to dump the weighed material from the other one and prepare it to receive the next charge of material. Thus, the feed stream is never interrupted or stopped but is continually feeding material to the weighing apparatus, resulting in weighing large volumes of the material in a minimum of time.

The apparatus is further designed and constructed so that no matter what part of its cycle it is in at shutdown, it will always start operating at a predetermined starting point in its cycle, that is, with the deflecting means positioned to direct the entire stream into a predetermined one of the receptacles. Operation of the deflecting means and the dumping mechanism result directly from weighing movements of the receptacles themselves.

Another feature of the invention is the provision of weighing receptacles which are volumetrically adjustable so as to vary their capacities. In this manner, the receptacles may be preadjusted so that the desired final weight of material substantially completely fills each receptacle and thus minimizes the amount of material in suspension, falling toward the receptacle, at the instant final weight is achieved.

The invention further contemplates numerous novel structural features which will be described in more detail hereafter.

It is, therefore, a principal object of this invention to provide a weighing apparatus capable of accurately weighing unusually large volumes of material in a relatively short time.

Another object of the invention is to provide a weighing apparatus capable of accurately weighing successive charges of material supplied thereto without interrupting or stopping the feed stream of material.

Still another object of the invention is to provide weighing apparatus of the type set forth in which the amount of material in suspension and falling into a receptacle at the time final weight is achieved is held to a minimum.

A further object is to provide apparatus of the type set forth wherein material fed to weighing devices is fed thereto in continuous bulk and dribble streams and wherein said streams are independently controlled.

A still further object is to provide an apparatus of the type set forth wherein a plurality of weighting devices and receptacles are employed and wherein said material is dumped from each receptacle at a time when no material is being deposited therein.

Another and further object of the invention is to provide an apparatus of the type set forth, operable through successive repetitive cycles and wherein the apparatus will always start at a predetermined point of its cycle.

An additional object of this invention is to provide weighing apparatus accompanying the aforementioned objectives but which is simple and economical to construct yet reliable and efficient in operation.

Other objects and advantages will become apparent to those skilled in the art as the description proceeds with reference to the accompanying drawings, wherein.

FIGS. 3, 4, 5, and 6 are fragmentary perspective views of a portion of the apparatus, respectively showing different relative positions of apparatus elements during successive portions of a cycle of operation, and;

FIG. 7 is a schematic circuit diagram showing the control circuits for the apparatus of FIGS. 1 through 6.

Figure 1:
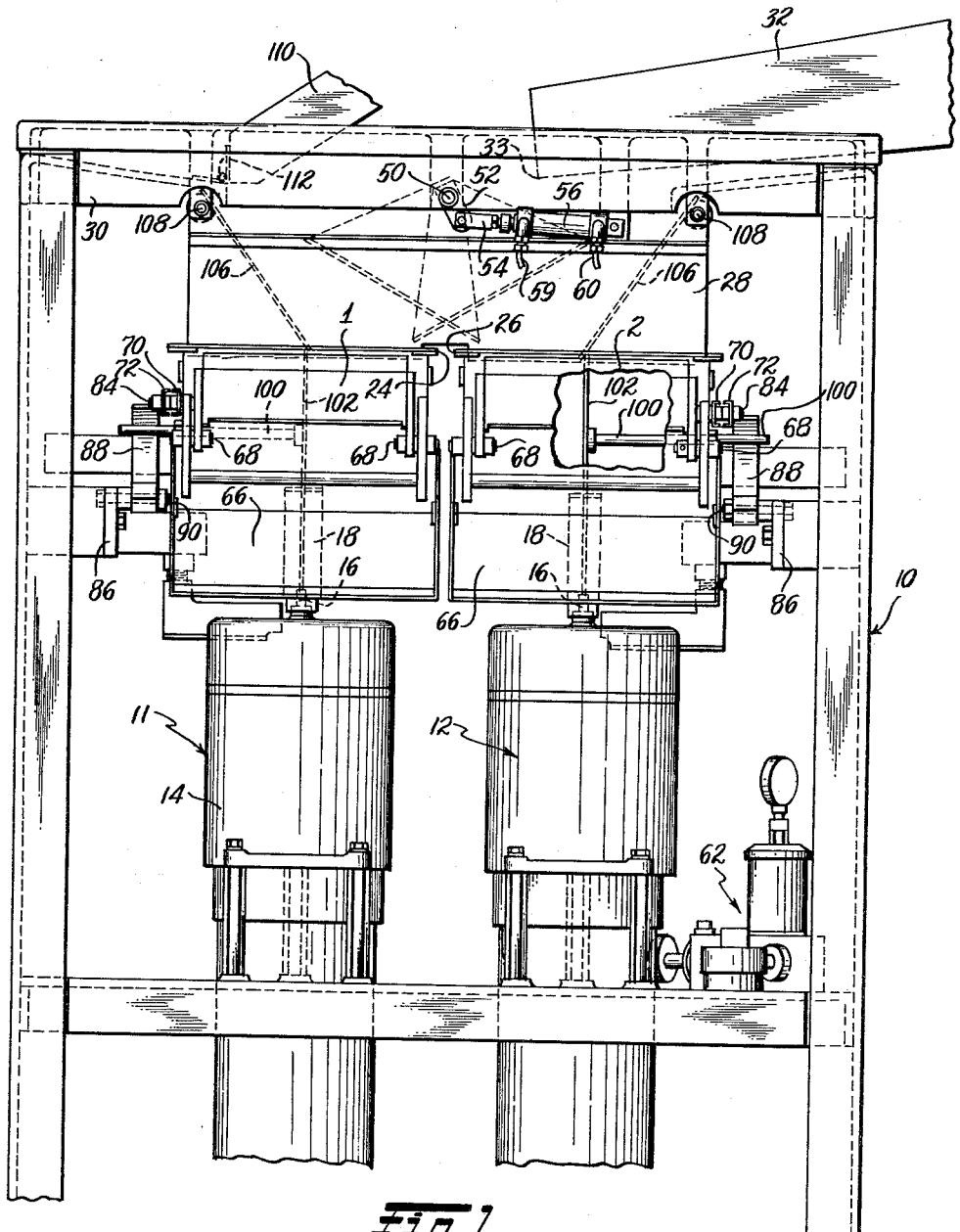
FIG. 1 is a front elevational view of a preferred embodiment of the invention with certain elements being omitted to simplify the illustration.
Figure 2:
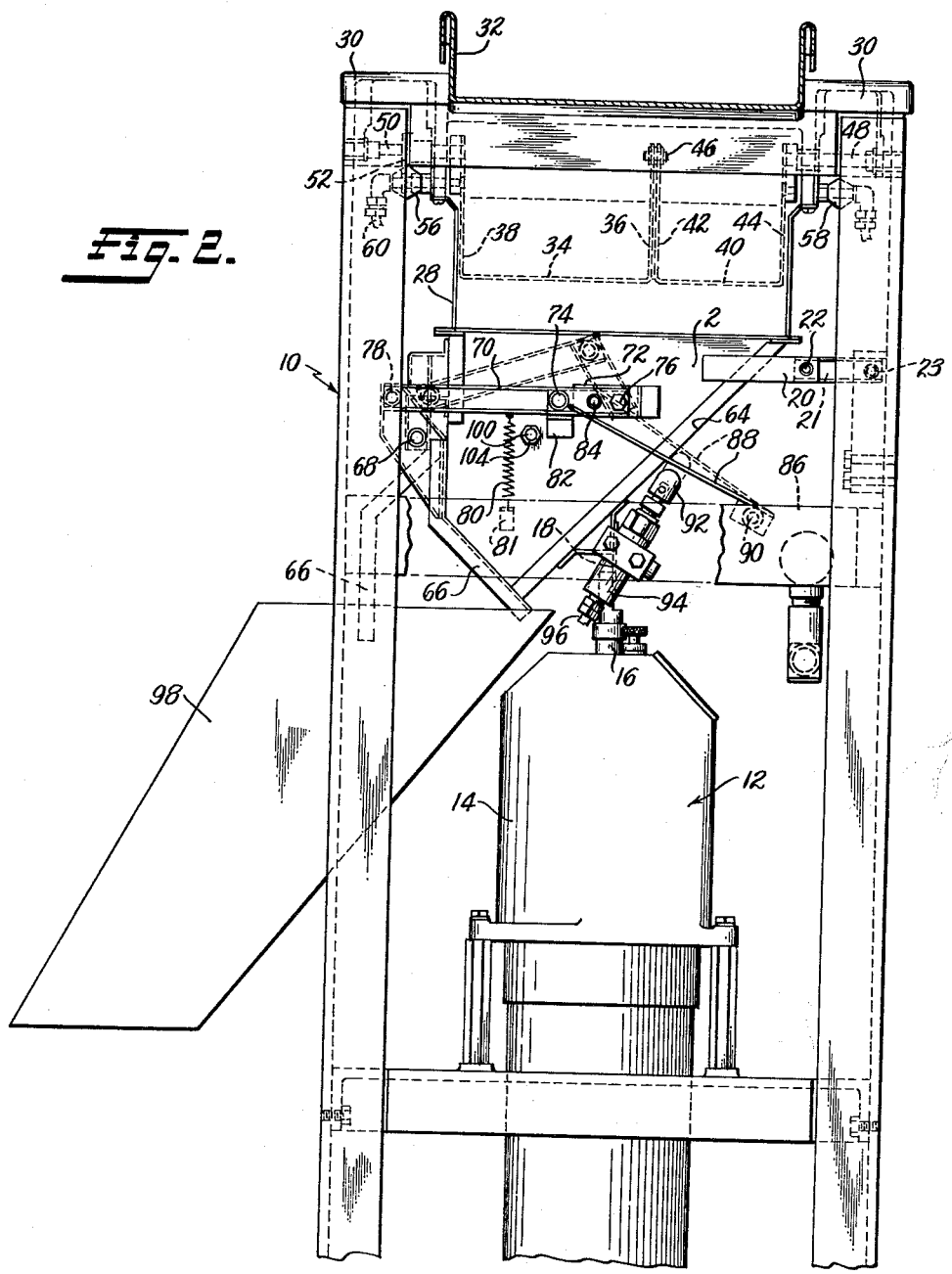
FIG. 2 is a side elevational view of the apparatus shown in FIG. 1.

Referring first to FIGS. 1 and 2, the apparatus of the present invention comprises a framework designated generally at 10 on which weighing devices 11 and 12 are mounted. The weighing devices 11 and 12 are substantial duplicates of each other so only one will be described, such description being applicable to both. Each weighing device comprises a tank 14 containing a quantity of liquid in which a float is buoyantly supported. The float is fixed to an upwardly extending shaft or rod 16 (see FIG. 2) which projects upwardly through the top of the tank 14 and is vertically movable with the float. A flexible support 18 (FIG. 2) is fixed to the upper end of rod 16 and flexibly supports a receptacle 2. The receptacle supported on the rod projecting from weighing device 11 is identified by numeral 1 in FIG. 1. Each receptacle has a bracket 20 fixed thereto and to which a link 21 is pivoted, at 22. The link 21 is in turn pivoted to the frame 10, at 23. The weighing device thus far described is conventional and well-known in the art. As is known, material deposited in the receptacle causes the float, previously mentioned, to ride at a lower level in the liquid and assume a new vertical position displaced downwardly by an amount proportional to the weight of material in the receptacle. Vertical movements of the receptacle in response to weight deposited therein or dumped therefrom will be referred to hereinafter as "weighing movements" thereof.

Each of the receptacles 1 and 2 is open at its top with adjacent edges 24 and 26 (FIG. 1) thereof closely adjacent each other but slightly spaced and generally parallel. A material confining wall 28 is mounted on an upper member 30 of frame 10 and defines a generally rectangular tubular guide to confine material to the area occupied by the open tops of receptacles 1 and 2. The wall 28 is merely a circumferential wall that defines a tubular guide open at both its top and bottom.

A suitable vibratory or other conveyor 32 is arranged to deliver a continuous stream of the material to be weighed and to discharge the same over its terminal end 33. Material thus discharged drops from the conveyor 32 generally toward the adjacent edges 24 and 26 of the weighing receptacles. A pair of deflectors are independently pivotally mounted on the upper portion 30 of frame 10 and serve to deflect all or part of the stream of material from conveyor 32 into one or the other of the receptacles 1 or 2. The structure of the deflectors is best shown in FIGS. 3 through 6 when considered with FIG. 2. There are, in fact, two separate deflectors provided, one of which comprises a generally flat plate 34 having upstanding flanges 36 and 38 at its opposite ends. The other deflector comprises a plate 40, also having upstanding flanges 42 and 44 at its opposite ends. The flange 36 of plate 34 and the flange 42 of plate 40 are closely adjacent each other and pivotally joined at a pivot 46. The end flange 44 of plate 40 has a shaft 48 (see FIG. 2) fixed thereto and journalled in the upper portion 30 of frame 10. Likewise, the flange 38 of plate 34 has a shaft 50 secured thereto and also journalled in the upper portion 30 of frame 10.

As shown, the conveyor 32 delivers its material to the apparatus and discharges same to fall within the confining wall 28, which wall surrounds and encloses the deflectors comprising plates 34 and 40. The shafts 48 and 50 are in axial alignment with each other and in axial alignment with the axis of pivot 46 between flanges 36 and 42. The position of the axis of shafts 48 and 50 and the size and dimensions of the plates 34 and 40 and their associated flanges are such that either plate 34 or 40 may be pivotally swung about the axis of shafts 48 and 50 in the manner shown by dotted line in FIG. 1. As will be obvious from the drawings, swinging of either deflector plate to one side will result in deflecting or directing material from the conveyor 32 into one of the receptacles while swinging that plate in the other direction will result in deflecting material falling thereon into the other receptacle.

As clearly shown in FIGS. 2 through 6, the plate 34 is of considerable length in the direction of the pivot axis, whereas the plate 40 is of relatively short length measured in that direction. The stream of material delivered by the conveyor 32 is of sufficient width so that at least a minor portion of it falls on the plate 40 and a larger or major portion thereof falls on the plate 34. The plate 34 can thus be manipulated to control what may be termed a bulk stream, whereas plate 40 controls what is commonly referred to as a dribble stream.

Each of the shafts 48 and 50 is provided adjacent its outer end with a fixed crank arm, only one of which is shown in FIG. 1 at 52 on shaft 50. The crank arm on shaft 48 does not appear in the drawings but may be considered to be identical to the arm 52. The crank arm 52 is pivotally connected to the piston rod 54 of a double-acting reciprocating pneumatic motor 56. An identical motor 58 is connected in the same way to the crank arm on shaft 48. Hose connections 58 and 60 may be selectively supplied with air under pressure to supply the same at either end of the conventional piston in the motor 56 to thereby actuate the motor through one stroke in either direction. The motor 58 is provided with identical hose connections (not identified). As will be obvious from the drawings, operation of either motor 56 or 58 in one direction or the other will result in swinging its associated deflector plate 34 or 40 to one or the other of the positions shown in dotted line in FIG. 1. A supply of compressed air is provided by suitable compressor and pressure regulator shown generally at 62 in FIG. 1. Hose or conduit connections from the air supply 62 to the motors 56 and 58 have been omitted from the drawings merely to simplify the illustration. The manner of making such connections is well-known to those skilled in the art and will become more fully apparent in the description that follows.

The supply lines leading from the air supply 62 to the motors 56 and 58 pass through solenoid operated control valves (not shown) but which will be described and referred to hereinafter.

Referring next to FIGS. 1 and 2, each receptacle is provided with a sloping bottom wall 64 at the lower end of which the receptacle is provided with an opening (not identified) through which material on the bottom 64 may be discharged by the action of gravity. The opening in each of the receptacles is closed by a closure 66. The closure 66 is hingedly mounted on the receptacles on a hinge axis 68. A toggle linkage comprising links 70 and 72 pivoted together at 74 controls the operation of the door 66. The links 70 and 72 are pivotally joined together at one end of each, the other end of link 72 being pivotally connected to the side of receptacle 2 by a pivot pin 76. The opposite end of link 70 is pivotally connected to a portion of the door structure 66 at 78, which is eccentrically offset from hinge axis 68. A tension spring 80 is connected at one end to link 70 and is anchored at its other end to a bracket 81 on the side of the receptacle 2. The spring 80 normally holds the toggle linkage in "locked in" position against a stop bracket 82 to thereby securely lock at door 66 in closed position. The link 72 is provided with a laterally extending projection 84. Pivotally mounted on an intermediate frame portion 86 is a spring lever 88 pivotally supported on the frame member 86 at 90. The spring lever 88 is mounted to swing in a plane into which projection 84 extends and it is of sufficient length to engage the projection 84 when swung upwardly, as seen in FIG. 2. A pneumatically operated plunger 92 is operated by a pneumatic motor 94, which is likewise mounted on the frame portion 86. The plunger 92 may be projected, by pneumatic pressure, from the motor 94 to engage spring lever 88 and swing the same upwardly to the position shown in dotted lines in FIG. 2. When the plunger 92 is in retracted position, the lever 88 swings downwardly to a position where it is spaced a substantial distance below the projection 84. Thus, the receptacle 2 with which projection 84 moves, is free to move in a vertical direction through its normal weighing movements without having projection 84 engage the lever 88. At an appropriate time in a cycle of operation, as will be described later, air under pressure is supplied to the motor 94 through a conduit 96 to project plunger 92 upwardly. This operation of motor 94 results in swinging lever 88 upwardly into engagement with projection 84 and to force the latter upwardly to "break" the toggle lock provided by links 70 and 72 and to swing that linkage to the position shown in dotted lines in FIG. 2. With the toggle linkage in the position shown in dotted lines, the door 66 is forced to the open position, also shown in dotted lines in FIG. 2, whereupon any material in receptacle 2 is discharged therefrom by gravity and falls into a suitable delivery chute 98.

Referring now to FIGS. 1 and 2, wherein the front wall of receptacle 2 is broken away, it can be seen that the interior of the receptacle is provided with at least one transverse rod 100, extending slidably through the outer side wall of the receptacle. A movable partition 102 is fixedly mounted on the inner end of rod 100 and can be fixed in any desired position within the receptacle by means of collet nut 104 (see FIG. 2) mounted on the receptacle side wall and operable to clamp rod 100 in any desired position of adjustment. The space to the left of partition 102 (referring to the right receptacle 2 of FIG. 1) constitutes the usable portion of the receptacle for receiving material from the deflector plates 34 and 40. Both receptacles 1 and 2 are provided with such an adjustable partition or other suitable means for varying the volumetric capacity of the receptacle. In preparing the apparatus for weighing a predetermined quantity of a particular material, the partitions 102 are adjusted to such position that the desired final weight of material will substantially fill the usable space within the receptacle, substantially to the top thereof. It is to be remembered that material delivered by conveyor 32 and deflected by plates 34 and 40 falls freely through the air from the deflectors into the respective receptacles. At the instant final weight is achieved in any one receptacle and the switches (to be described) responsive thereto are actuated, some material will still be falling from the deflectors into the receptacles. By regulating the volume of the receptacle to such value that final weight builds the material level up as near as possible to the lower edge of the deflector, it will be obvious that a minimum quantity of material remains in suspension after the final weight switch is actuated. Whatever material remains in suspension must fall into the receptacle and will increase the actual weight of material deposited therein above the desired amount. It is obviously desirable that such overage be held to a minimum.

Secured to the upper frame portion 30 are plates 106, pivotally adjustable on the frame at 108. The plates 106 are of such length that they will extend over the upper edges of partitions 102, regardless of the position of adjustment thereof, so as to insure against any of the delivered material from falling into a receptacle on the wrong side of the adjustable partition.

The apparatus is also preferably provided with a retractable hood 110 pivoted to the frame structure at 112 and overlying the end of conveyor 32 and the deflector members to thereby protect the apparatus against entry of undesirable foreign material. The hood 110 is hinged to the apparatus to permit its being swung out of the way, as shown in FIGS. 3 to 6, whenever it is necessary to have access to the deflectors or the partitions 102.

The weighing devices 11 and 12 include switches (not shown) responsive to vertical movements of the weighing receptacles and rods 16. Such switches are conventional in weighing devices of this type. In the present apparatus each weighing device is provided with two such switches, one of which is actuated by downward movement of rod 16 when its receptacle has received a predetermined "bulk" amount of material closely approaching but less than the final weight desired. This switch will be referred to as a "bulk" switch. The other switch of each weighing device is actuated by weighing movements of the receptacles and rods 16 upon attainment of the final desired weight. These switches will be referred to as "dribble" switches. In accordance with the present invention, both switches on one weighing device, for example, those on weighing device 11, are normally closed and are actuated to open position by the accumulation of weight. On the other hand the switches on the weighing device 12 are normally open and are sequentially closed as weight is accumulated. The bulk and dribble switches associated with each weighing device respectively control bulk and dribble four-way solenoid operated valves, which in turn direct air under pressure to the pneumatic motors 56 and 58. Such solenoid operated valves are well-known in the art and need not be described in detail. A further solenoid operated valve is provided for each of the pneumatic motors 94, which function to dump material from the receptacles.

Figure 6:
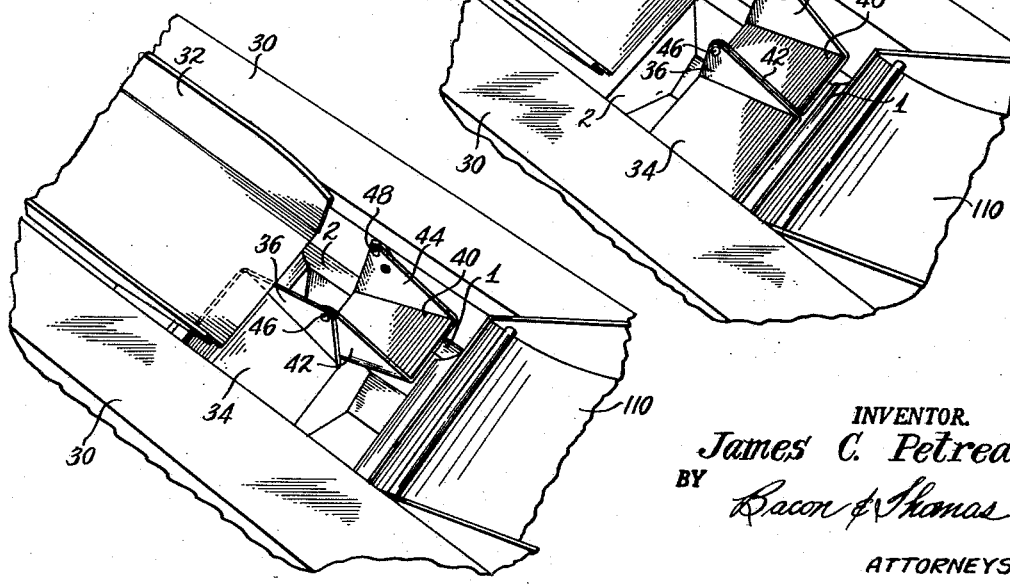

In the operation of the apparatus, at the start of a "run," neither receptacle contains any material so both of them are in their uppermost position with the two switches controlled by receptacle 1 being open and the switches controlled by receptacle 2 being closed. With the switches in the described condition, the solenoid operated valves are so positioned as to direct air to the appropriate ends of motors 56 and 58 to hold both deflector plates 36 and 40 in a position to deflect all material into receptacle 1 and such flow continues until bulk weight is achieved in that receptacle. At that time the bulk switch operated by receptacle 1 closes to energize a relay, which in turn directs current to the appropriate coil of the solenoid operated valve controlling bulk motor 56 to actuate the same and effect tilting of the bulk plate deflector 34 to the position shown in FIG. 4 wherein it deflects the major portion of the stream of material into receptacle 2. A dribble stream continues to fall into receptacle 1 until final weight is achieved therein. When such final weight is achieved in receptacle 1, the dribble switch associated therewith closes and energizes a second relay which in turn directs current to the solenoid valve controlling motor 58 to swing deflector plate 40 to the position shown in FIG. 5, at which time the entire stream of material is being directed to receptacle 2. At the same time the last named relay closes a circuit through the solenoid operated valve controlling dump motor 94 for receptacle 1 and the same is supplied with compressed air to effect dumping of the weighed charge therefrom into the delivery chute 98 in the manner previously described. While the material is thus being dumped from receptacle 1, the receptacle is pushed by spring lever 88 to its uppermost position which opens the bulk and dribble microswitches assoicated therewith. However, as will be shown, the motors 56 and 58 are not again operated upon opening of those switches but the deflectors remain in a position to deflect the entire stream into receptacle 2 until bulk weight has been achieved therein, and the door 66 of the opposite receptacle is held open, at which time the normally closed bulk switch associated with receptacle 2 opens to de-energize the first mentioned relay and return the bulk deflector to its original position as shown in FIG. 6 and effects closing of the door of receptacle 1. The achievement of final weight in receptacle 2 opens its normally closed dribble switch and de-energizes the second relay to return the dribble deflector 50 to the position of FIG. 3. At the same time the dump motor associated with receptacle 2 is actuated to dump the same, while receptacle 1 is again being filled. The described cycle is repeated as long as power is supplied to the apparatus and material is fed thereto.

Referring now to FIG. 7, which schematically illustrates the electrical circuits involved in the above described cycle of operation, numerals 120 and 121 designate the normally open switches associated with receptacle 1, whereas numerals 122 and 123 designate the normally closed switches associated with receptacle 2. Numeral 124 designates the relay controlled by the two bulk switches whereas 125 designates the relay controlled by dribble switches 121 and 123. The elements in FIG. 7 identified as bulk valves and dribble valves are shown as separate valves. However, such illustration is merely for the purpose of convenience, it being understood that both dribble valves and both bulk valves may be a single valve structure (the four-way solenoid valve previously mentioned).

Switch points 126, 127, 128, 129 and 130 are controlled by relay 124, switch points 126, 127, and 129 being normally open while switch points 128 and 130 are normally closed. Relay 125 controlled by the dribble switches operates switch contact points 131, 132, 133, 134 and 135, switch points 131, 132 and 133 being normally open, while 134 and 135 are normally closed.

Figure 3:
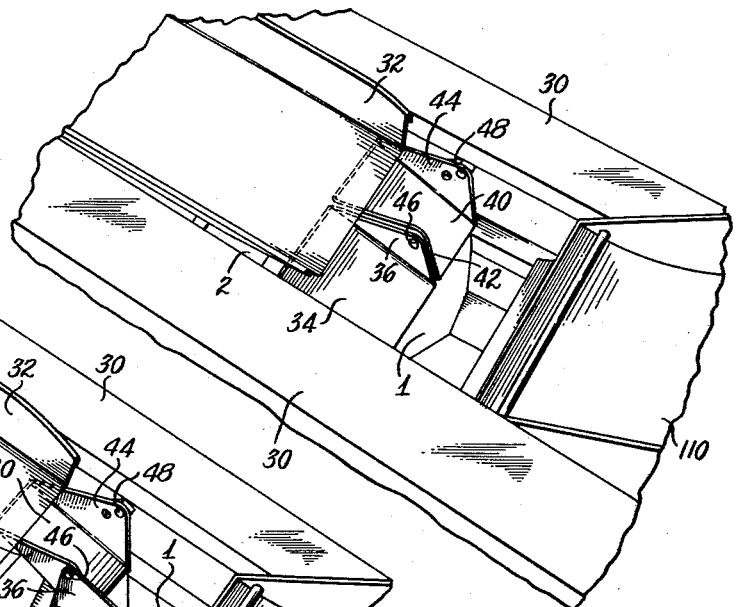
Figure 4:
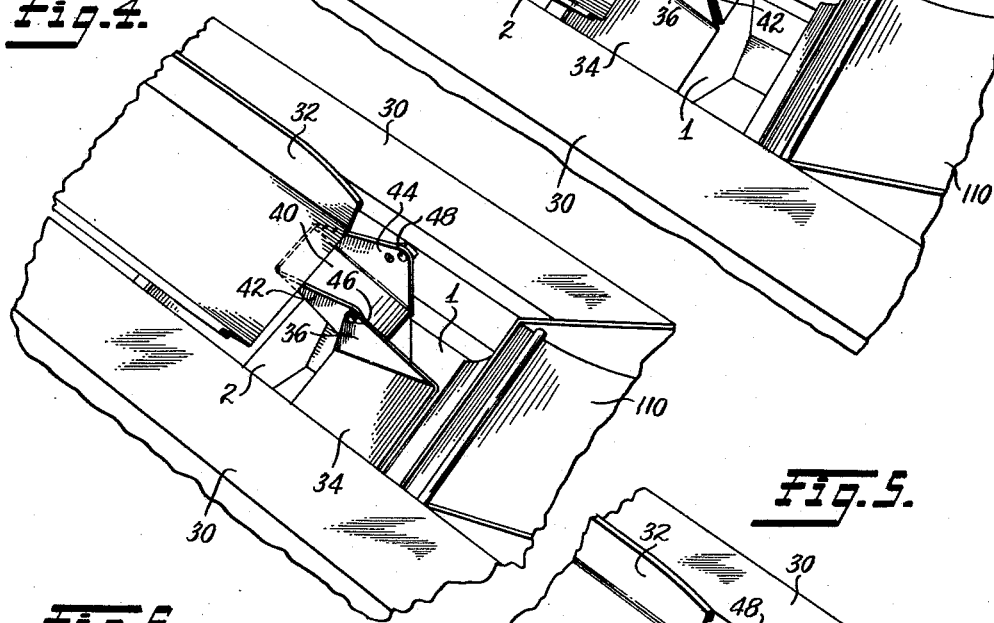
Figure 5:
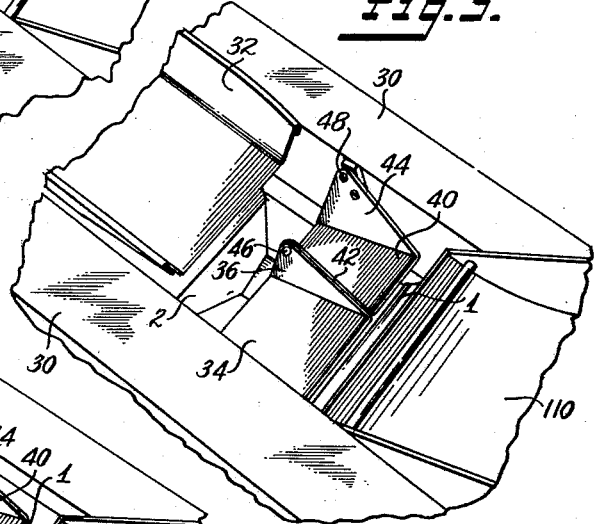

With the parts in the positions described, the closing of main switch 136 energizes the circuit but neither relay 124 nor 125 is energized. Bulk valve No. 1 and dribble valve No. 1 are both actuated to operate motors 56 and 58 to position the deflectors as shown in FIG. 3. Upon attaining a bulk weight in receptacle 1, switch 120 closes and energizes relay 124. This closes switch 126 to hold relay 124 energized even upon subsequent opening of switch 120. It also closes switch 127 to energize bulk valve No. 2 to shift the bulk deflector to the position of FIG. 4. The circuit through bulk valve No. 1 is opened to permit shifting the bulk deflector. Switch No. 129 is closed but as yet has no effect on dump valve No. 1. Swith 130 is opened as a result of energizing relay 124 and de-energizes the dump valve for receptacle 2 so that the door thereon will close and retain the material being deflected thereinto by the bulk deflector. Upon attainment of final weight in receptacle 1, switch 121 closes and energizes relay 125. The operation of relay 125 closes switches 131, 132 and 133 and opens switches 134 and 135. The closing of switch 132 closes a holding circuit for relay 125 and closing of switch 133 energizes dribble valve No. 2 to swing the dribble deflector to the position of FIG. 5. At the same time switch 134 is opened to permit this shifting of the dribble deflector, switch 135 is opened but no immediate effect is produced, anw switch 131 is closed to energize the valve controlling dumping motor 94 for receptacle 1. Thus the material is dumped from receptacle 1 while the deflectors are in the position of FIG. 5. Upon dumping of material from receptacle 1, the same rises and switches 120 and 121 open. However, relays 124 and 125 remain energized since holding switches 126 and 132 have been closed and switches 122 and 123 are normally closed. Upon achievement of bulk weight in receptacle 2, switch 122 opens, thus de-energizing relay 124 and again opening switches 126, 127 and 129 and closing switches 128 and 130. Opening of switch 127 actuates bulk valve No. 2 and closes bulk valve No. 1, whereby the bulk deflector is shifted to the position of FIG. 6. Upon achievement of final weight in receptacle 2, switch 123 opens, thus de-energizing relay 125 and opening switches 131, 132 and 133 and closing switches 134 and 135. Both switches 130 and 135 are now closed. Further, dump valve No. 2 is opened to energize dumping motor 94 controlling the closure on receptacle 2 while the deflectors are again back in the starting position shown in FIG. 3. At this time all parts have returned to their starting position and the described cycle is repeated.

While the single specific embodiment of the invention is shown and described herein, it is to be understood that the same is merely illustrative of the inventive concept which may be embodied in other forms falling within the scope of appended claims.

I claim:

1. A weighing apparatus comprising; a pair of weighing devices each having a moveable material-receiving receptacle, said receptacles being positioned closely adjacent each other; means for delivering a continuous stream of material to a position adjacent said receptacles; a pair of moveable deflector members each being moveable, to selectively deflect material from said stream into one or the other of said receptacles; said deflector members being independently and separately moveable and one being arranged to deflect the major portion of said stream while the other is arranged to deflect the remaining minor portion thereof; and actuator means for moving said deflector members; said actuator means being responsive to weighing movements of said receptacles to sequentially position said deflector members to: deflect said entire stream into one receptacle until a predetermined bulk weight of material is accumulated therein; then to move said one member to deflect the major portion of said stream into the other receptacle; to thereafter move said other member, when the desired final weight of material is in said one receptacle, to deflect said minor portion to said other receptacle; and to repeat said described cycle.

2. A weighing apparatus as defined in claim 1 wherein said actuator means are operable to normally position both said deflector members to deflect said entire stream into a predetermined one of said receptacles.

3. A weighing apparatus as defined in claim 1 including means for dumping weighed material from each of said receptacles during intervals when no material is being deflected thereto; said dumping means being responsive to operation of said actuator means upon movement of said other deflector member.

4. A weighing apparatus as defined in claim 1 wherein said actuator means includes a pair of control switches responsive to weighing movements of each of said receptacles; the switches responsive to a first of said receptacles being normally open and the switches responsive to the second receptacle being normally closed; and motor means for moving said deflector members, said motor means being operable in response to closing of the switches of said pairs.

5. A weighing apparatus as defined in claim 1 wherein each of said receptacles is volumetrically adjustable whereby the capacity of each may be adjusted so that a predetermined weight of material therein will substantially fill the same.

6. A weighing apparatus comprising; a pair of weighing devices each having a moveable material-receiving receptacle, said receptacles having edges closely adjacent each other; a pair of deflector members overlying and spanning the space between said adjacent edges; said deflector members being mounted for independent tilting movement about an axis generally parallel to said adjacent edges whereby to direct material thereon into one or the other of said receptacles; feed means for directing a continuous stream of material onto said deflector members so that a major portion of said stream falls on one deflector and the remaining minor portion thereof falls on the other deflector; and actuator means for independently tilting said deflector members about said axis.

7. A weighing apparatus as defined in claim 6 wherein said actuator means comprises a motor for each deflector member and means responsive to weighing movements of each receptacle for controlling said motors.

8. A weighing apparatus as defined in claim 6 wherein each deflector member comprises a generally flat plate having an upstanding flange at each of its opposite ends with one flange of each being substantially in abutment with a flange of the other and pivoted thereto; said axis being above said plates and coincident with the pivot connection between said flanges; the other flange of each plate being pivotally supported about said axis.

9. A weighing apparatus as defined in claim 8 wherein said other flanges are supported about said axis by shafts secured to said flanges and extending outwardly therefrom; a crank arm on each shaft; said actuator means comprising a double-acting reciprocatory motor connected to each crank arm and control means responsive to weighing movements of said receptacles; there being two control means associated with each receptacle and each being arranged to cause actuation of one of said motors in one direction.

10. A weighing apparatus as defined in claim 6 wherein said one deflector member is relatively long in the direction of said axis and wherein said other deflector member is relatively short in said direction.

11. A weighing apparatus as defined in claim 6 including an adjustable partition in each of said receptacles; each portion being moveable toward and from said deflector members whereby to selectively change the volumetric capacity of each receptacle.

12. A weighing apparatus as defined in claim 6 wherein each receptacle is provided with a material discharge opening adjacent the bottom thereof; a closure for each opening; and means responsive to said actuator means for opening the closure on one receptacle when said deflector members are positioned to deflect all of said stream into the other receptacle.

13. A weighing apparatus comprising a pair of weighing devices each having a moveable material-receiving receptacle; means responsive to weighing movements of each of said receptacles for producing a first signal when a predetermined weight of material, less than final weight, is present in said receptacle; means responsive to weighing movement of each receptacle for producing a second signal when a predetermined final weight of material is in said receptacle; means for delivering a continuous stream of material to said apparatus; directing means for directing material from said stream to one or the other of said receptacles; said directing means being actuable to direct all of said stream to either one of said receptacles and being responsive to said first signal to direct the major portion of said stream to the other receptacle and responsive to said second signal to direct the remaining minor portion of said stream to said other receptacle.

14. A weighing device comprising, a vertically moveable material-receiving receptacle; feed means for dropping a stream of material into said receptacle from a predetermined elevation adjacent the top thereof; means responsive to vertical weighing movement of said receptacle for interrupting said stream upon deposit of a predetermined weight of material in said receptacle; and means for changing the volumetric capacity of said receptacle whereby a selected predetermined weight of material will fill said receptacle substantially up to said predetermined elevation so that the last increments of material do not fall through an appreciable distance and, therefore, do not produce spurious vertical weighing movements of said receptacle by their momentum.

15. A weighing device as defined in claim 14 wherein said stream of material is dropped into said receptacle adjacent a side wall thereof, said last-named means comprises a moveable partition in said receptacle, selectively moveable toward or from said side wall.

References Cited in the file of this patent

UNITED STATES PATENTS

| | | |
|---|---|---|
| 1,013,136 | Deats | Jan. 2, 1912 |
| 2,260,718 | Merrifield | Oct. 28, 1941 |
| 2,408,906 | Bocchicchio | Oct. 8, 1946 |
| 2,616,652 | Rose | Nov. 4, 1952 |
| 2,669,412 | Nowak | Feb. 16, 1954 |
| 2,670,921 | Dodd | Mar. 2, 1954 |
| 2,979,145 | Kay | Apr. 11, 1961 |